United States Patent
Wu et al.

(10) Patent No.: US 6,851,816 B2
(45) Date of Patent: *Feb. 8, 2005

(54) LINEAR LIGHT SOURCE DEVICE FOR IMAGE READING

(75) Inventors: Rong-Yaw Wu, Hsin-Tien (TW); Ming-Jen Pang, Taipei (TW)

(73) Assignee: Pixon Technologies Corp., Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/288,444

(22) Filed: Nov. 6, 2002

(65) Prior Publication Data

US 2003/0210557 A1 Nov. 13, 2003

Related U.S. Application Data

(63) Continuation-in-part of application No. 10/141,126, filed on May 9, 2002, now Pat. No. 6,786,626.

(51) Int. Cl.[7] .................................................. F21V 7/04
(52) U.S. Cl. ....................... 362/31; 362/555; 362/243; 362/327
(58) Field of Search ........................... 362/31, 555, 30, 362/236, 240, 243, 327, 339, 800

(56) References Cited

U.S. PATENT DOCUMENTS

| | | | | | |
|---|---|---|---|---|---|
| 5,276,591 | A | * | 1/1994 | Hegarty | 362/31 |
| 5,283,673 | A | * | 2/1994 | Murase et al. | 349/65 |
| 5,400,224 | A | | 3/1995 | DuNah et al. | |
| 6,357,903 | B1 | * | 3/2002 | Furusawa et al. | 362/555 |
| 6,357,904 | B1 | * | 3/2002 | Kawashima | 362/555 |
| 6,375,335 | B1 | * | 4/2002 | Tabata et al. | 362/31 |
| 6,461,007 | B1 | * | 10/2002 | Akaoka | 362/31 |
| 6,520,655 | B2 | * | 2/2003 | Ohuchi | 362/31 |
| 6,545,732 | B2 | * | 4/2003 | Nakano | 349/58 |
| 2001/0019480 | A1 | * | 9/2001 | Fujino et al. | 362/31 |

FOREIGN PATENT DOCUMENTS

| | | | |
|---|---|---|---|
| JP | 61-197437 | * | 9/1989 |
| JP | 8-163320 | * | 6/1996 |
| TW | 326931 | | 2/1998 |
| TW | 420306 | | 1/2001 |

* cited by examiner

*Primary Examiner*—Sandra O'Shea
*Assistant Examiner*—Hargobind S. Sawhney
(74) *Attorney, Agent, or Firm*—Rosenberg, Klein & Lee

(57) ABSTRACT

A linear light source device for image reading. The main body of the linear light source device includes at least a light-guide bar and a light source assembly. The light-guide bar is a polygonal column with one surface having stripes thereon, acting as a reflective plane with a reflective function. The opposite plane to the reflective plane is a light-exiting plane, and all the remaining planes are reflective layers. At least one of the ends of the polygonal column is an incident plane for a light beam to enter. Light is transmitted through both of the two ends of the polygonal column (or one end with the other end acting as a reflective plane) and uniformly transmits through the light-exiting plane. The light-guided bar has a simple structure and configuration, a compact volume, a high rate of utilization in light energy, is flexibly changed in length, and is easy to manufacture with high product yield and low manufacturing cost. In addition, it can provide uniform monochromatic and colored light, with high luminance, and at a low cost.

15 Claims, 15 Drawing Sheets

LINEAR LIGHT SOURCE DEVICE FOR IMAGE READING

This application is a continuation in part of Ser. No. 10/141,126, filed May 9, 2002 Now U.S. Pat. No. 6,786,626.

FIELD OF THE INVENTION

The invention relates to a light source, and more particularly to a linear light source device for image reading in equipment, such as scanners, facsimile machines, multifunction office machines, and copy machines.

BACKGROUND OF THE INVENTION

An image reading device such as a scanner, facsimile machine, multi-function office machine, and copy machine etc. needs a linear light source to illuminate the targets while liquid crystal modules needs to have an illuminated background. The method utilizes a light source combined with a light-guide bar so as to transfer the light source into a linear light source, in this way, the backlight can be provided for a liquid crystal panel.

Conventional linear light source devices for image reading are as follows: (1) utilize a cold cathode ray tube (CRT) as the linear light source 110 as shown in FIG. 1; (2) utilize a light-emitting diode (LED) array for the linear light source 120 as shown in FIG. 2; (3) utilize an LED array plus prismatic lens for the linear light source 130 as shown in FIG. 3; (4) utilize a prismatic light-guide bar for the linear light source 140 as shown in FIG. 4; (5) utilize a prismatic light-guide bar plus a housing for the linear light source 150 as shown in FIG. 5A and FIG. 5B; (6) utilize a light-guided bar for the linear light source 160, 170, 180, and 190 made up of the structure formed by the intersection of prismatic column planes and oblique planes as shown in FIG. 6, FIG. 7, FIG. 8A, FIG. 8B, FIG. 9A, and FIG. 9B.

The above-mentioned linear light source 110 shown in FIG. 1 is composed of a cold CRT 112 and a transfer circuit 114. The luminescence of the cold CRT 112 is the same as that of the fluorescent tube (hot CRT) except that it is suitable for small tube diameter since it has simple structure and compact electrode. But this technology needs to have a transfer circuit provided, making the overall size relatively large. Since the cold CRT 112 is a cylindrical type of luminaire, the rate of light energy utilization is low and it is unable to generate light with different wave-lengths. Additionally, it is fragile and has a short lifetime.

As shown in FIG. 2, a number of LEDs 124, such as forty pieces, are mounted on a substrate 122. The rate of light energy utilization is low since the space angle of the radiation can be greater than a half of a space. Moreover, since spaces exist between the LEDs, and since it is inconsistent in luminous intensity, the light uniformity is poor. Further, since a large number of LEDs 124 are required, the cost is high.

As shown in FIG. 3, many a quantity of LEDs 124, such as forty pieces, are mounted on a substrate 122. A prismatic lens 132 is also provided. In contrast with FIG. 2, although the addition of this prismatic lens 132 improves the rate of light energy utilization and light beam uniformity, the rate of light energy utilization is still low. Besides, it has the demerit of being high in cost.

Another conventional technology is shown in FIG. 4. The light is transmitted by the use of a prismatic light-guide bar 142 whose cross-section can be a circle, a rectangle, a triangle, an ellipse, or an irregular shape etc. The incident light 200 having an incident angle greater than the critical angle transmits into the light-guide bar 142 by total reflection without a loss in radiant flux, then goes through the light-guide bar 142 and exits out through the light-exiting plane to become an exiting light beam 202. As the light falls on the stripes of the surface, light having an incident angle smaller than the critical angle, refract from the stripes 144 of the surface to become out-refracting light 204. In the meantime, in contrast to the surface with stripes, the light also falls on the smooth surface. Those light beams having an incident angle smaller than the critical angle also refract from the smooth surface to become out-refracting light 206. Since the light-guide bar 142 is merely a simple prismatic column and the surface stripes 144 are in a simple belt-shape, the light uniformity is poor.

Another conventional technology is shown in FIG. 5A and FIG. 5B. A linear light source 150 is composed of a light-guide bar 152, a light source assembly 300, and a housing 158. The cross-section of the light-guide bar 152 show the prismatic column is a pentagon by cutting a corner of a rectangle or a polygon by cutting two or more corners of a rectangle. The plane formed by cutting an angle is a light-exiting plane 154. The side surfaces other than the two neighboring side surfaces between the light-guide bar 152 and the light-exiting plane 154 are coated with reflective layers 156 (see FIG. 5B). A housing 158 is provided, separating by a thin air layer, between the light-exiting plane 154 and at least a plane other than an end plane of the two end planes provided by the light source assembly 300. This kind of technology not only increases the size of the device a but also the cost since the housing 158 is required. The device is apt to generate a light beam having its incident angle smaller than the critical angle. Moreover, the light beam reflected from the plane of the light-guide bar 152 allows only a portion to be reflected from the inner wall surface of the housing 158 and is then refracted back again into the light-guide bar 152. As a result, the rate of light energy utilization is not high. Further, since the device depends merely on the reflective layers 156 to adjust the output radiant flux distribution, the uniformity is not sufficient.

Another technology is shown in FIG. 6 and FIG. 7. As shown in FIG. 6, a linear light source 160 is composed of a light-guide bar 162 and a light source assembly 300. The cross-section of the light-guide bar 162, constituted by the intersection of a prismatic column and an oblique plane, is a rectangle. Surface stripe 165 and reflective layers 166 are provided on an oblique surface 164 on the oblique plane, and the light-exiting plane 178 is opposite to the oblique surface 164. The linear light source 170 is composed of a light-guide bar 172 and two-end light source assembly 300. As shown in FIG. 7, the light-guide bar 172 is constituted by the intersection of a prismatic column and an oblique plane. The cross-section of the prismatic column is a rectangle and the oblique plane has two oblique surfaces 174. A light-exiting plane 178 is provided opposite to the oblique surfaces 174. The remaining setup is the same as those in FIG. 6. Since the cross-sections of the light-guide bars 162 and 172 are rectangular, light having an incident angle smaller than the critical angle is easy to generate. As a result, there is a loss of radiant flux making the rate of light energy utilization poor. Since the device depends merely on the linear variation of oblique planes 164, and 174 as well as the adjustment of the output radiant flux distribution, the light beam uniformity is poor.

In FIGS. 8A and 8B, a linear light source 180 is composed of a light-guide bar 182 and light source assemblies 300 positioned at both ends. The light-guided bar 182 is constituted by the intersection of a prismatic column and an oblique plane. The cross-section of the prismatic column is an irregular shape (see FIG. 8B). The oblique planes are made up of pair of two oblique surfaces 184, of the light-guide bar 182, inclined in opposite directions. The light-exiting planes 186 are other prismatic column planes of non-cylindrical planes. The surface stripes 188 are opposite the light-exiting plane 186. Since the cross-sections of the light-guided bars 182 is an irregular shape, light beam having an incident angle smaller than the critical angle is easy to generate. As a result, there is a loss of radiant flux and the rate of light energy utilization is not high. Further, since the device depends merely on the linear-varied oblique surface 184 to adjust the output radiant flux distribution, the uniformity is not sufficient.

In FIGS. 9 and 10, a linear light source 190 is composed of a light-guide bar 192 and a light source assembly 300. The light-guide bar 192 is constituted by the intersection of a prismatic column and an oblique plane. The cross-section of the prismatic column is an irregular shape (see FIG. 10). The oblique plane is an oblique curved surface, and the light-exiting planes 196 is an irregular prismatic column plane. The surface stripes 198 are coated with a reflective layer are on opposite the light-exiting plane 196. Additionally, a groove 199 formed by two oblique surfaces is provided. Since the cross-sections of the light-guide bars 192 is an irregular shape, light having an incident angle smaller than the critical angle is easy to generate. As a result, there is a loss of radiant flux, and the rate of light energy utilization is poor. Further, since the reflective layer is a simple belt-shape and the device depends merely on the oblique curved surface 194 and groove 199 to adjust the output radiant flux distribution, the uniformity is not sufficient.

SUMMARY OF THE INVENTION

An objective of the invention is to provide a linear light source device used for image reading. The light-guide bar is simple in structure and configuration, thereby; the precision requirements are rational and not rigorous. As a result, the fabrication cost for the mold or tooling is low. Moreover, the reflective plane having surface stripes with reflective function are surface treated for surface roughness, the reflecting paint can be but does not have to be spread or coated. Therefore, the manufacturing yield of an ideal light-guided bar is easy to achieve.

Another objective of the invention is to provide a linear light source device for image reading wherein the length of the light-guide bar used can be cut to be shorter to become a relatively short light-guided bar.

Still another objective of the invention is to provide a linear light source device for image reading. The linear light source is illuminated by a point light source, or a point light source obtained through a transfer of light, which is transmitted through the light-guide bar to obtain a linear exiting light.

A further objective of the invention is to provide a linear light source device for image reading. The linear light source can generate respectively the monochromatic light having different wave-lengths, and can be combined into a linear light source with a relatively long wave-length.

Yet another objective of the invention is to provide a linear light source device for image reading. The linear light source of the present invention is particularly applicable for image reading devices such as scanners, facsimile machines, multi-function office machines, and copy machines etc. that need linear light source to illuminate targets, and for the liquid crystal modules that need an illuminated background.

To achieve the above objectives, the invention provides a linear light source including a light-guide bar and a light source assembly.

The light-guide bar includes a polygonal main body having at least a tail end plane for light to enter; at least two planes in opposite locations of the main body provide a reflective plane with surface stripes and a corresponding light-exiting plane, and the remaining planes constituting reflective layers with reflecting function so that the light beam transmitting into the incident plane and transmitted through the polygonal main body as well as the multiple reflections of the reflective plane and layers can be transmitted out of the light-exiting plane.

One of the surfaces of the polygonal main body is a light-exiting plane that is not film-coated with white reflective paint while the corresponding reflective plane having surface stripes needs to be film-coated with white reflective paint. The stripes are treated by segmentation such that surface roughness is relatively smooth near the light source while the surface roughness is increased gradually as the stripes are positioned away from the light source according to the increase of the distance from the in order to make the light beam uniformly distributed so as to improve the uniformity of the light beam transmitting out of the light-exiting plane. The rest of the surfaces of the polygonal main body being reflective layers having reflective functions can be film-coated with white reflective paint. Both the two tail end planes can be incident planes for light. If a beam of light beam is transmitted from a light source at both ends through the main body, then the two end planes are not coated with white reflective paint. But if one tail end is an incident plane and the other tail end is a reflective plane, then the reflective end plane can reflect the light beam back into the polygonal main body, thereby, the reflective end plane needs to be coated with white reflective paint.

The light source assembly is connected to the incident end of the light-guide bar. A contact-type image sensor (CIS) is employed as the incident light source of the light-guide bar. The light source assembly includes a polygonal seat-type positioning plane, a reflective plane, and at least a light-emitting diode (LED) mounting in the mounting plane. The polygonal seat-type positioning plane is connected and tightly fitted to the incident tail end of the light-guide bar of the CIS where the light-guided bar is perpendicular to the mounting plane of the light source assembly.

The centerline, which is the light axis of the light source assembly, of the main body of the non-closed polygonal light-guide bar is perpendicular to the mounting plane. A non-closed polygonal main body constituting the positioning plane is tightly fitted to the incident end of the polygonal light-guide bar of the CIS and the other seat-type plane constituting the positioning plane contacts with the tail end plane of the incident end of the light-guided bar of the CIS.

Since the positioning plane intersects the polygonal main body on a plane, and the positioning plane is tightly fitted to the incident end of the light-guided bar of the CIS, the other plane constituting the positioning plane contacts the end plane of the incident end of the light-guide bar of the CIS. Therefore, the present invention possesses highly precise characteristics on the connecting position of the incident end of the light-guide bar of the CIS. Consequently, leakage of the incident light source of the light-guide bar of the CIS is reduced to a minimum. As a result, the invention is superior on the consistency of the distribution of luminous intensity.

What is more, at least one of the LED is mounted on the mounting plane so that the LED has a distance closest to the light axis and the LED is uniformly distributed. Therefore, the luminous intensity is uniformly distributed and concentrated at the light axis. As a result, the light energy utilization and the light beam uniformity are substantially improved.

Since all one has to do is to have the incident end of the light-guide bar of the CIS directly plug in, it is relying on the tight fitting between a non-closed polygonal main body constituting the positioning plane and the incident end of the light-guided bar of the CIS, the connecting work is accomplished without using the conventional art of molten rivet connection. Therefore, the invention can simplify the art of connecting, and thereby, lower the production cost.

In order to further understand the objectives, characteristics, and the efficacy of the invention, a detailed description with accompanied drawings is provided as follows:

DETAILED DESCRIPTION OF THE EMBODIMENTS

Figure 1:
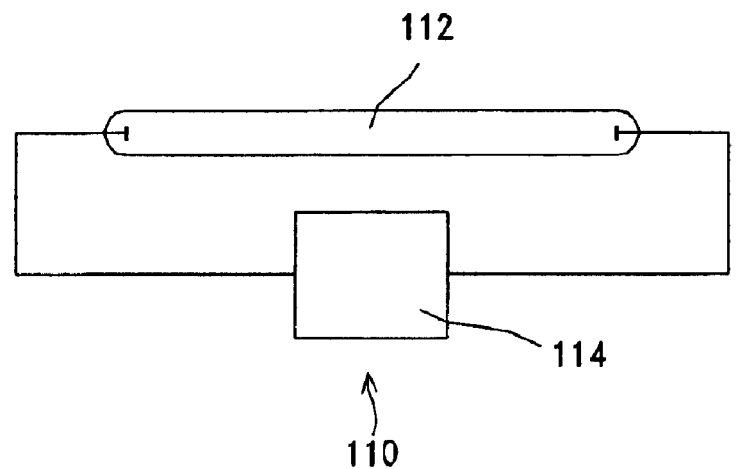
FIG. 1 is a schematic plan view of a cold CRT employed by the linear light source of the prior art.
Figure 2:
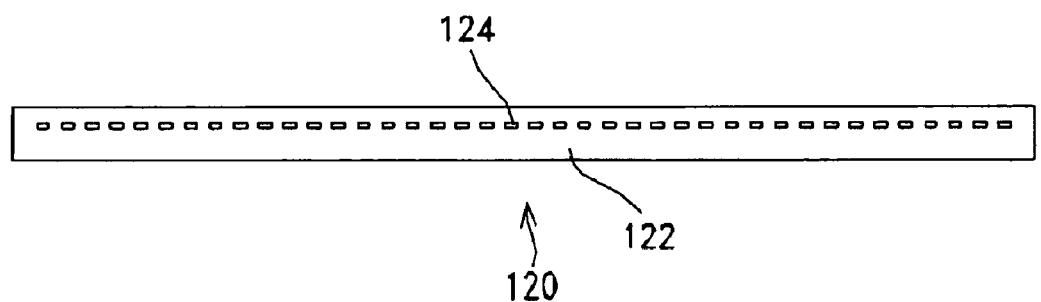
FIG. 2 is a schematic plan view of LED array employed by the linear light source of the prior art.
Figure 3:
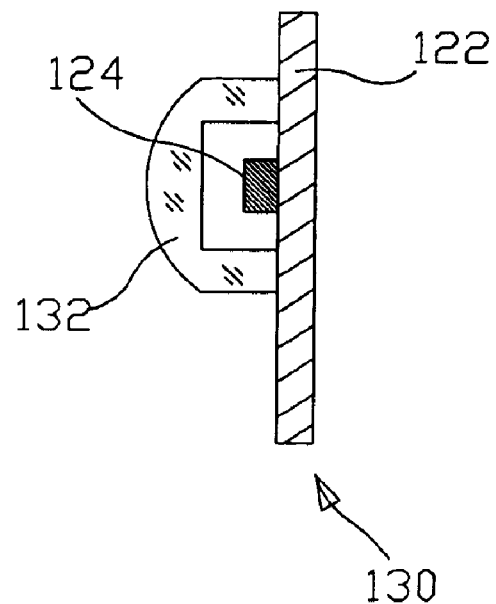
FIG. 3 is a schematic cross-sectional view of an LED array plus a prismatic column plane employed by the linear light source of the prior art.
Figure 4:
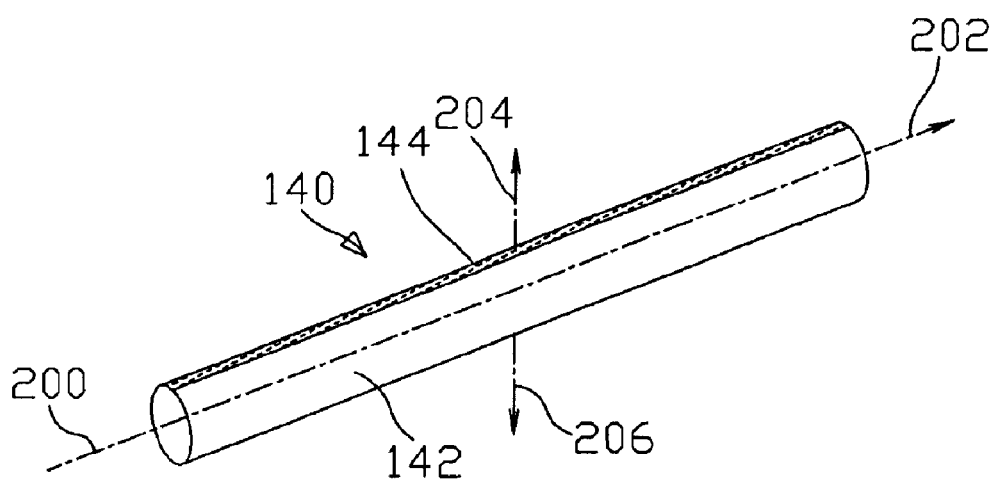
FIG. 4 is a schematic isometric view of a prismatic light-guided bar employed by the linear light source of the prior art.
Figure 5A:
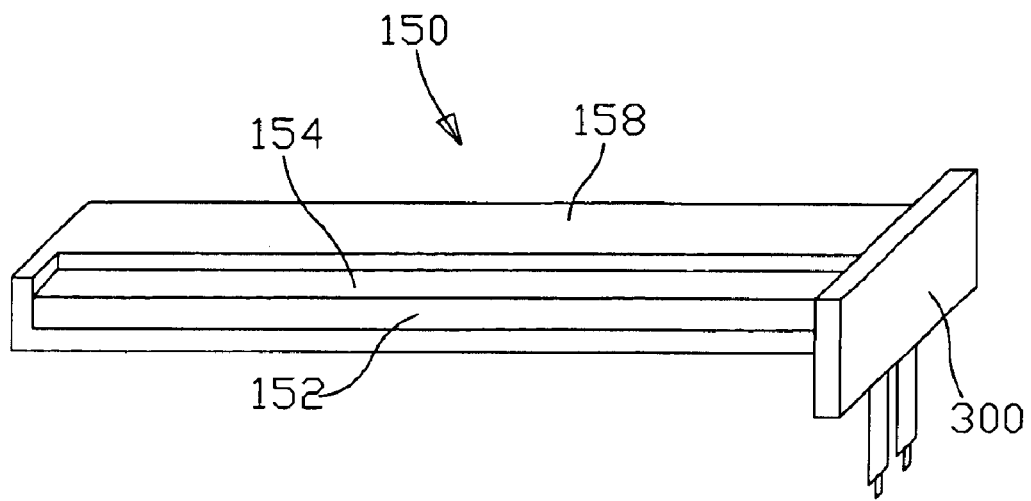
FIG. 5A is a schematic isometric view of a prismatic light-guided bar plus a housing employed by the linear light source of the prior art.
Figure 5B:
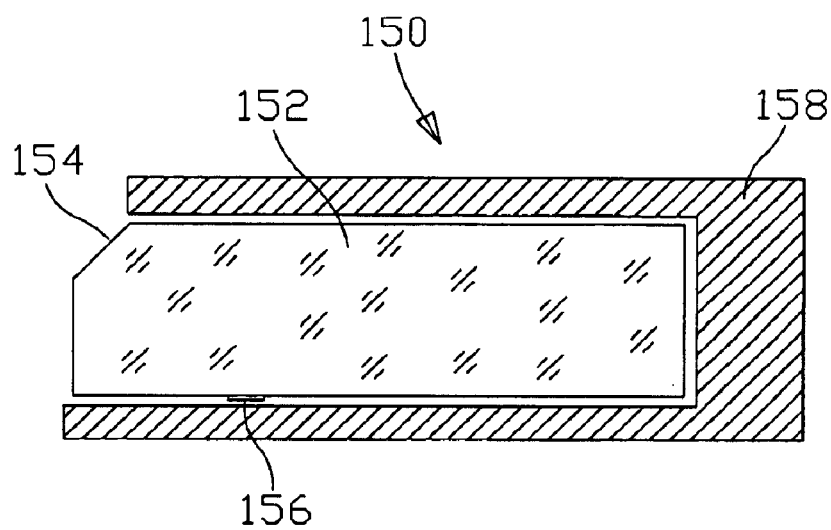
FIG. 5B is a schematic cross-sectional view of FIG. 5A.
Figure 6:
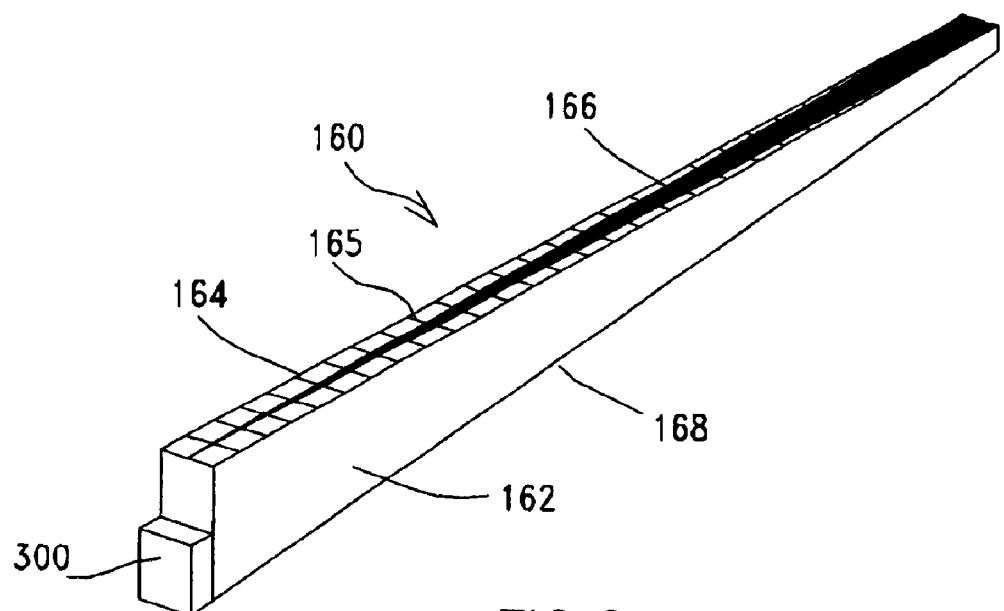
FIG. 6 is a schematic isometric view of a light-guided bar, constituted by the intersection of a prismatic column plane and an oblique plane, employed by the linear light source of the prior art.
Figure 7:
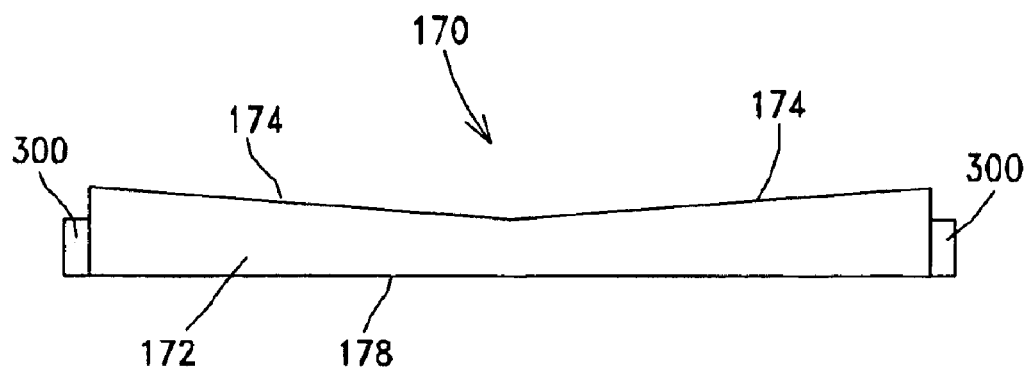
FIG. 7 is a schematic plan view of a light-guided bar, constituted by the intersection of a prismatic column plane and an oblique plane, employed by another linear light source of the prior art.
Figure 8A:
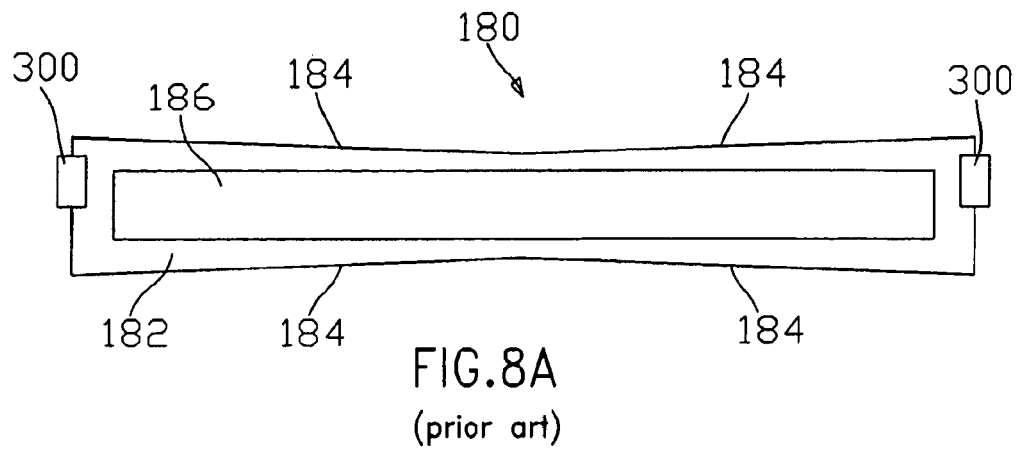
FIG. 8A is a schematic plan view of a light-guided bar, constituted by the intersection of a prismatic column plane and an oblique plane, employed by the linear light source of the prior art.
Figure 8B:
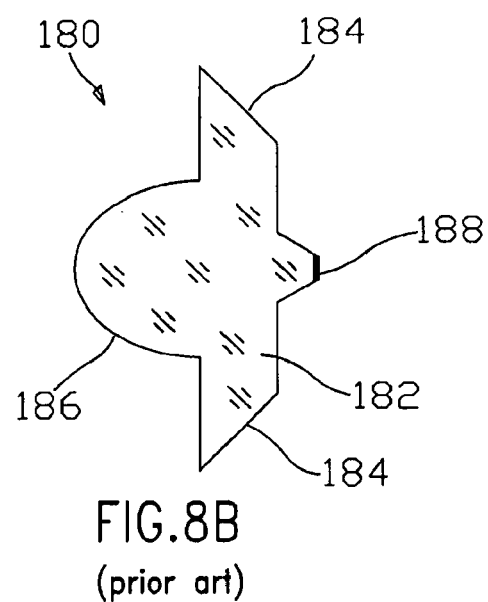
FIG. 8B is a schematic cross-section view of FIG. 8A.
Figure 9:
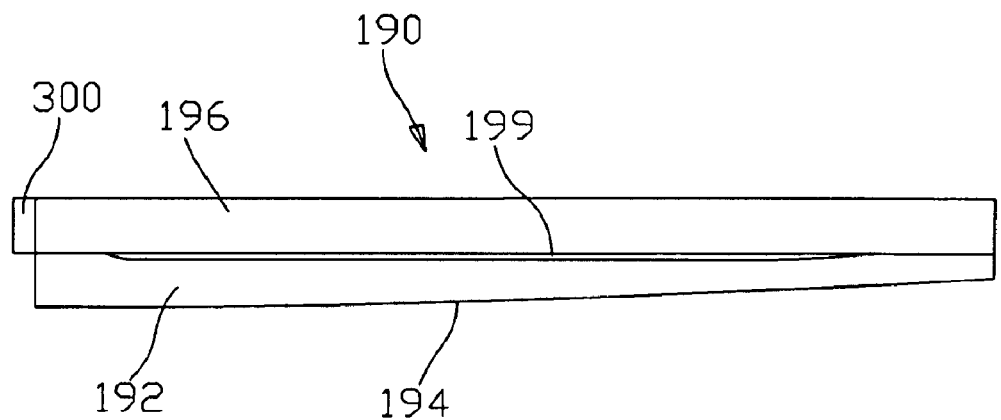
FIG. 9 is a schematic plan view of a light-guided bar, constituted by the intersection of a prismatic column plane and an oblique plane, employed by the linear light source of the prior art.
Figure 10:
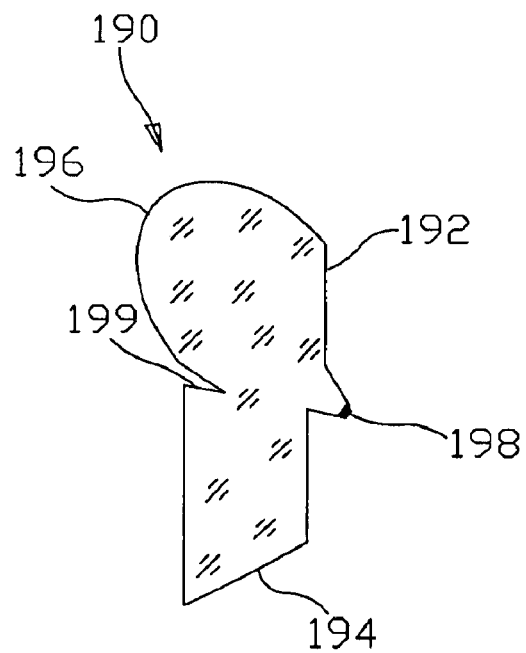
FIG. 10 is a schematic cross-sectional view of FIG. 9.
Figure 11:
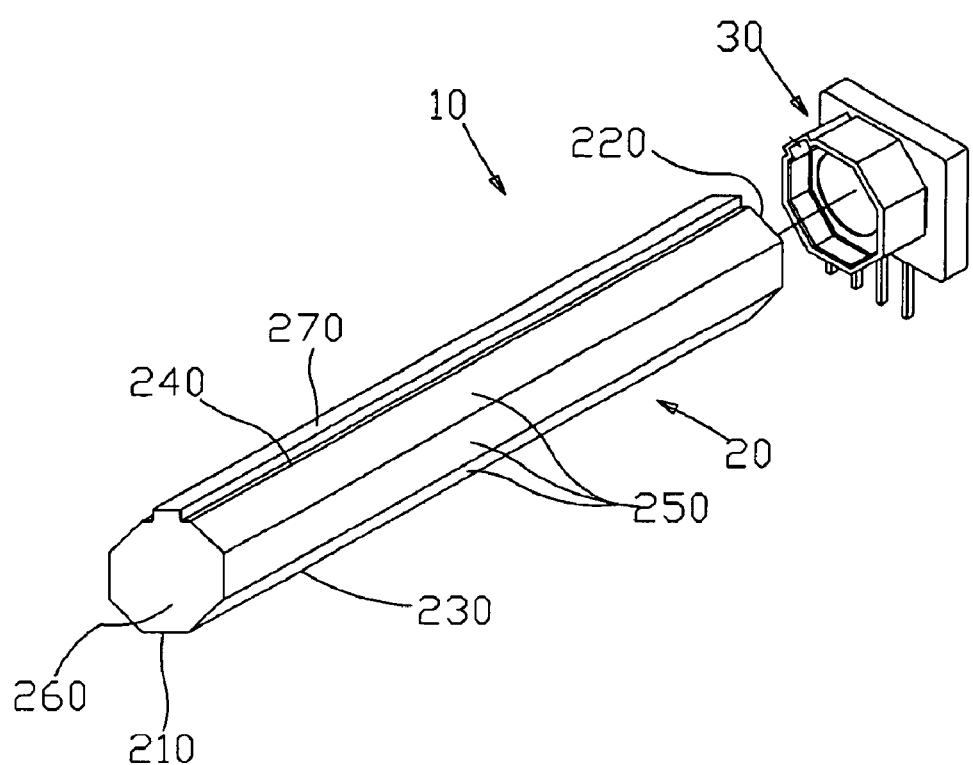
FIG. 11 is an isometric view of the structure of a light-guide bar according to an embodiment of the present invention.

Refer to FIG. 11, which is an isometric view of a preferred embodiment of the invention. As shown in FIG. 11, the linear light source 10 of the invention comprises a light-guide bar 20 and a light source assembly 30. Essentially, the light-guide bar 20 is an octagonal polygonal main body, and being a symmetrical octagonal column 210, it is selected as a preferred embodiment of the invention. The symmetrical octagonal column 210 includes: an incident plane 220 having at least an end into which the light beam is allowed to enter while the other end can be a tail end 260; a reflective plane 230; a light-exiting plane 270; and a plurality of reflective layers 250. A long protruding strip is provided on a side surface of the symmetrical octagonal column 210 and is used as the light-exiting plane 270. On either side of the light-exiting plane 270 are reflecting strips 240 for reflecting light that slightly misses the light-exiting plane 270. The reflective plane 230 and the light-exiting plane 270 are provided respectively on the side surfaces of the symmetrical octagonal column 210 and are opposite to each other. The remaining side surfaces are all for reflective layers 250. The reflective layer 250 is composed of a multiplicity of rectangular planes with their light axes at angles to both the reflective plane 230 and light-exiting plane 270. The reflective layers 250 are connected to the reflective plane 230 and light-exiting plane 270 respectively. Moreover, material used for the symmetrical octagonal column 210 comprises an optical material with high transmittance and low absorption characteristics such as acrylic-plastic sheets. Preferably, the surface roughness and the refractive index of the light-guide bar 20 is as low as possible as it makes the incident angle of the incident light beam greater than critical angle so that total reflection can be achieved and the loss of radiant flux is reduced.

Figure 12A:
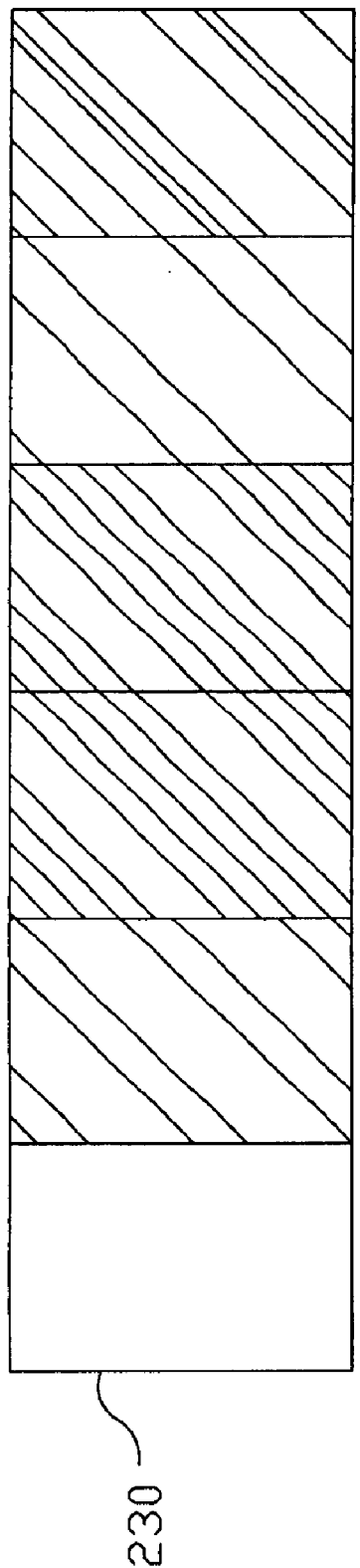
FIG. 12A is a schematic cross-sectional view of the structure of the light-guide bar according to an embodiment of the present invention.
Figure 12B:
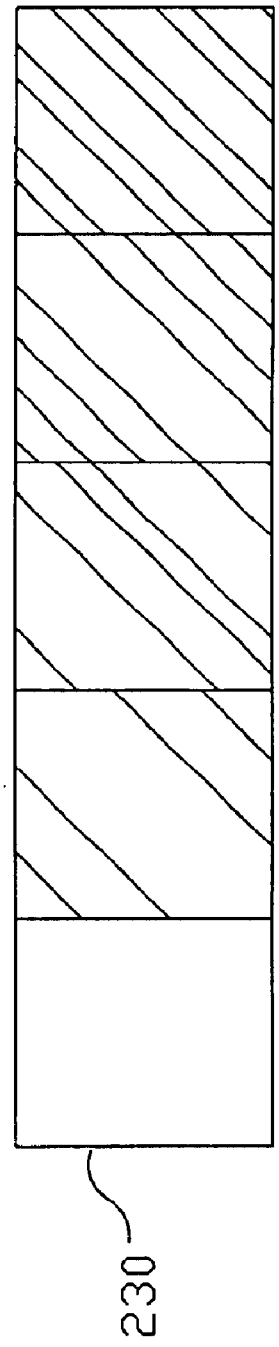
FIG. 12B is another schematic cross-sectional view of the structure of the light-guide bar according to an embodiment of the present invention.

A surface treatment can be performed on the surface of the reflective plane 230. Refer to FIG. 12A and FIG. 12B, which are schematic cross-sectional views of the light-guide bar 20 of the invention. As shown in FIG. 12A and FIG. 12B, the surface stripes can be classified into two types. One type is that the surface roughness is higher farther away from the light source and is lower nearer the light source. The other type is treated by segmentation so that each segment has different surface roughness in order to increase or decrease the coefficients of reflection, refraction, and absorption. A surface having relatively high surface roughness is high in scattering ability and large in reflective angle. Conversely, a surface having relatively low surface roughness is low in scattering ability and small in reflective angle and, in the meantime, can change its radiant flux. Similarly, one can decrease or increase the area of the surface stripe by changing the length of the symmetrical octagonal column 210 in order to adjust the magnitude of the radiant flux to improve the uniformity of the light beam. The light-exiting plane 270 is provided relatively to the reflective plane 230. The reflective layer 250 is composed of a multiplicity of rectangular planes that can connect to both of the reflective plane 230 and light-exiting plane 270. In addition, the light axis, i.e. the X-axis of each of the transmitting plane, is perpendicular to both the reflective plane 230 and light-exiting plane 270.

Figure 13:
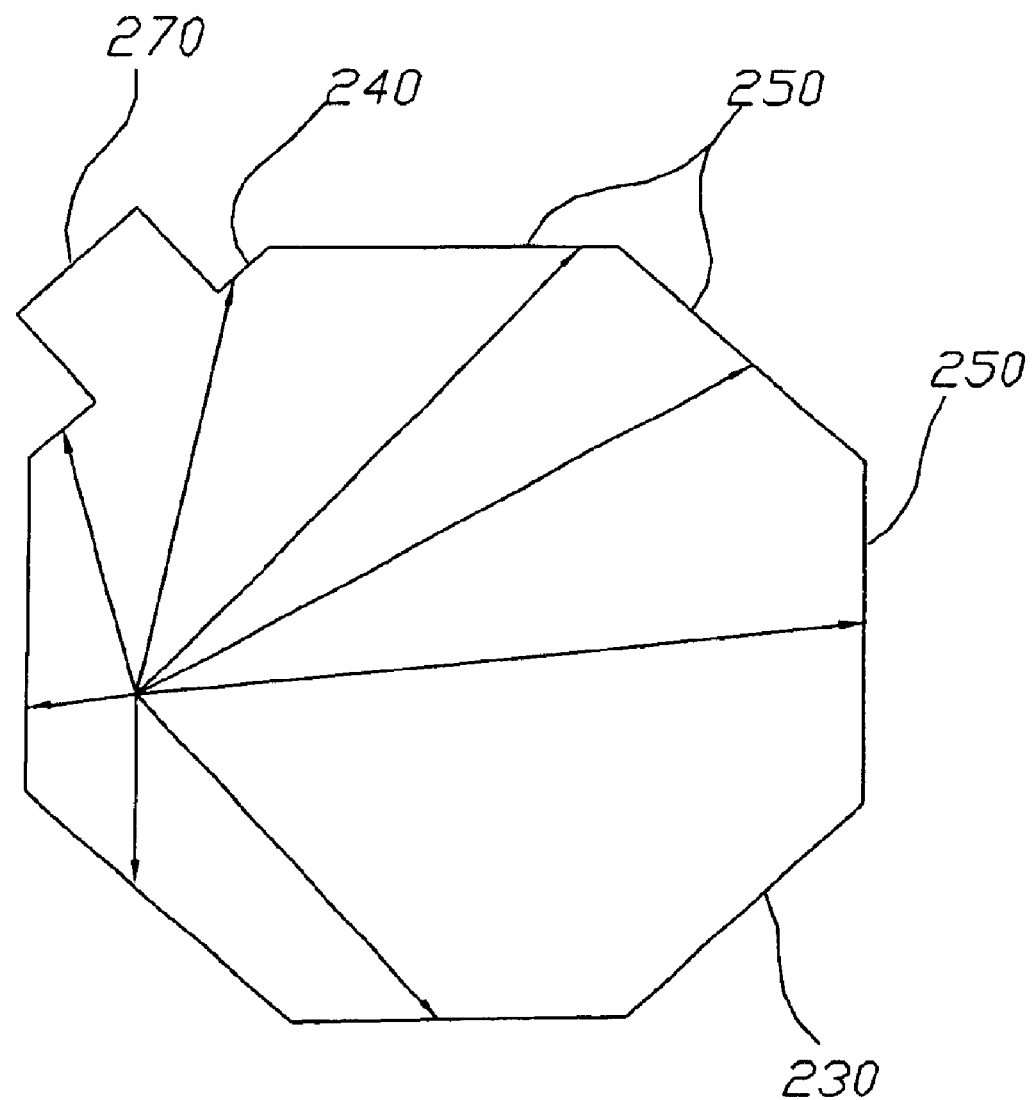
FIG. 13 is an illustration showing the light beam path according to an embodiment of the present invention.
Figure 14:
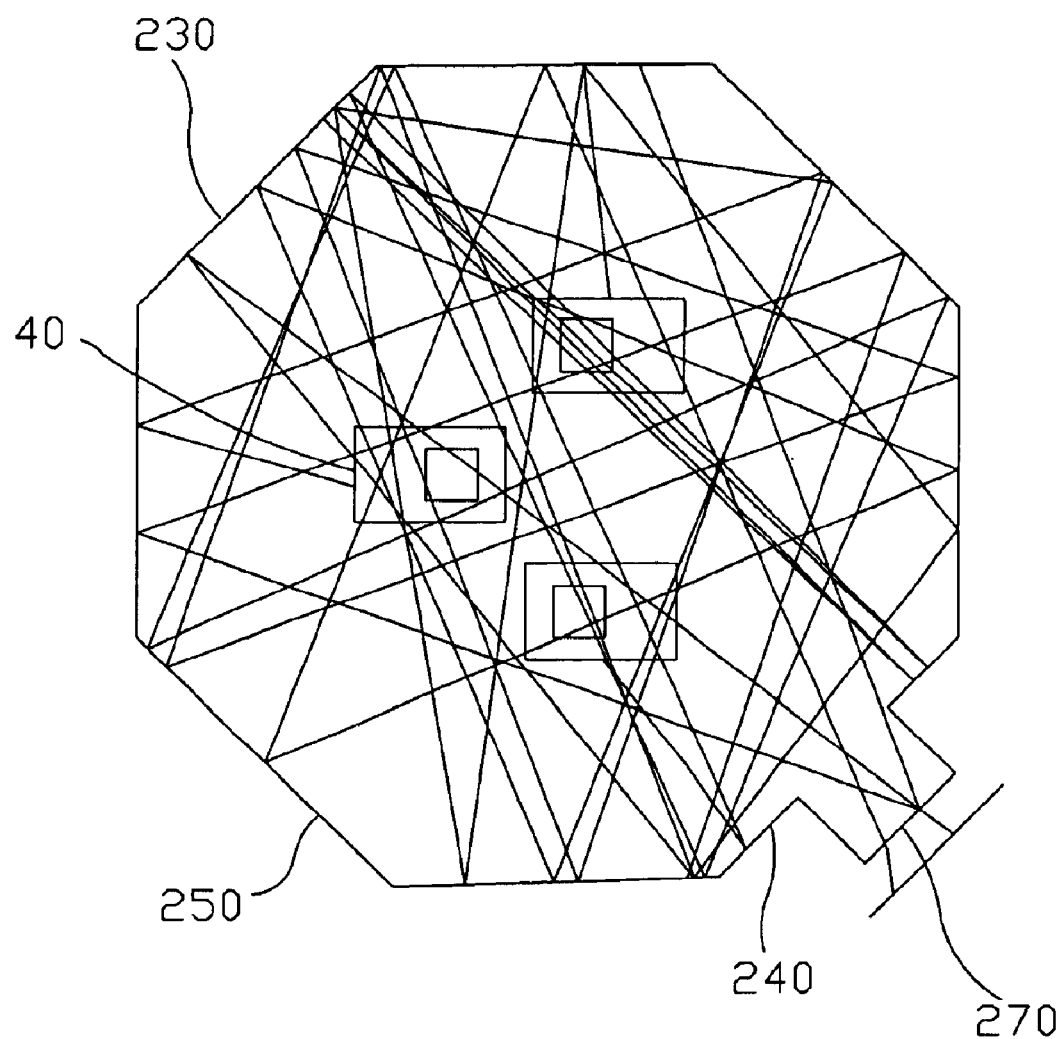
FIG. 14 is another illustration showing the light beam path according to an embodiment of the present invention.

Refer to FIG. 13 and FIG. 14, which are drawings showing the light beam paths of the invention. As shown in FIG. 13 and FIG. 14, the light beam entering the incident plane 220 through a multiplicity of reflections of the plurality of reflective layers 250 so as to improve the light beam uniformity by concentrating the light beam on the reflective plane 230. It then transmits toward the light-exiting plane 270 through the reflection of the reflective plane 230. The light beam uniformity is improved substantially since a surface treatment is performed on the reflective layers 250 of the reflective plane 230. The tail end face 260 at the other end of the symmetrical octagonal column 210 is coated with white or silver color or light-reflective paint by the film-coating method. Thereby, the light can be reflected once more back to the symmetrical octagonal column 210 to further improve the utilization of light energy. Similarly, the non-incident plane 60, reflective plane 230, and the reflective layers 250 can also be coated with white or silver color of light-reflective paint to facilitate the improvement of utilization of light energy and the index of reflection. It can further reduce the possibility of being absorbed by the material and lower the index of absorption.

The stripes in the inner face of said reflective plane can be grooved stripes, wherein the change in width, depth and the method of segmentation of said stripes can cause different roughness, and the roughness of each segment is the same.

Figure 15:
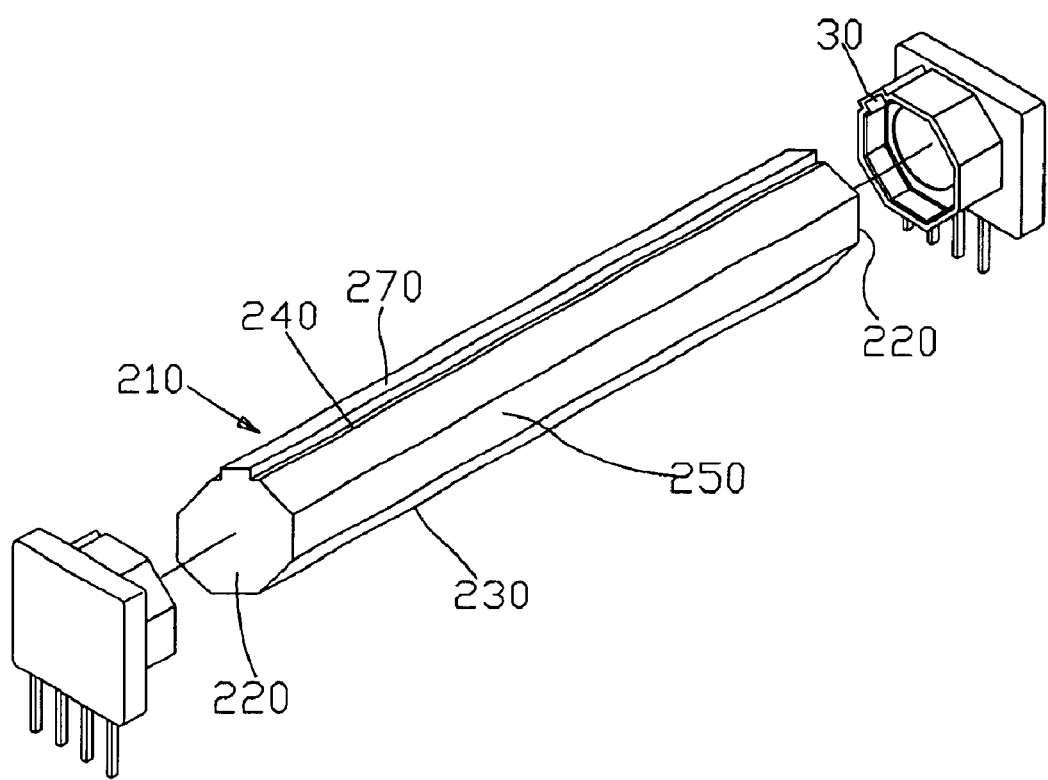
FIG. 15 is an isometric view of the light source assembly according to an embodiment of the present invention.

FIG. 15 is an isometric view of the light source assembly of an embodiment of the invention. As shown in FIG. 15, the other end of the symmetrical octagonal column 210 can also be an incident plane 220 for the light beam so that both ends of the symmetrical octagonal column 210 can allow the entering of the light beam.

Figure 16:
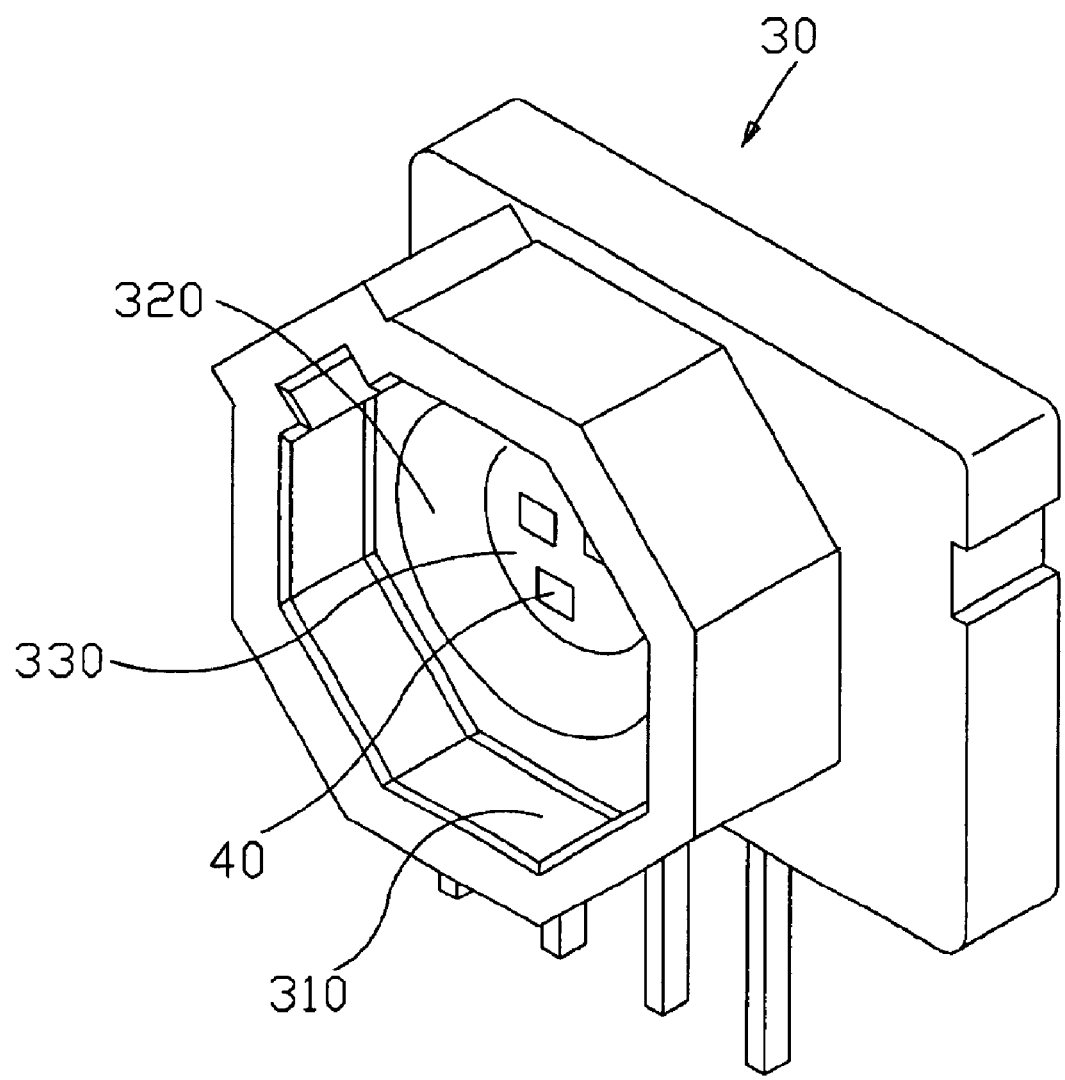
FIG. 16 is an isometric view of the light source assembly according to an embodiment of the present invention.

FIG. 16 is an isometric view of light source assembly of another embodiment of the invention. As shown in FIG. 16, the light beam assembly includes a mounting plane 310, a positioning plane 320, and a reflective surface 330 where the mounting plane 310 has the same profile as that of the symmetrical octagonal column 210. Additionally, at least a mounting location is needed for an LCD.

Figure 17A:
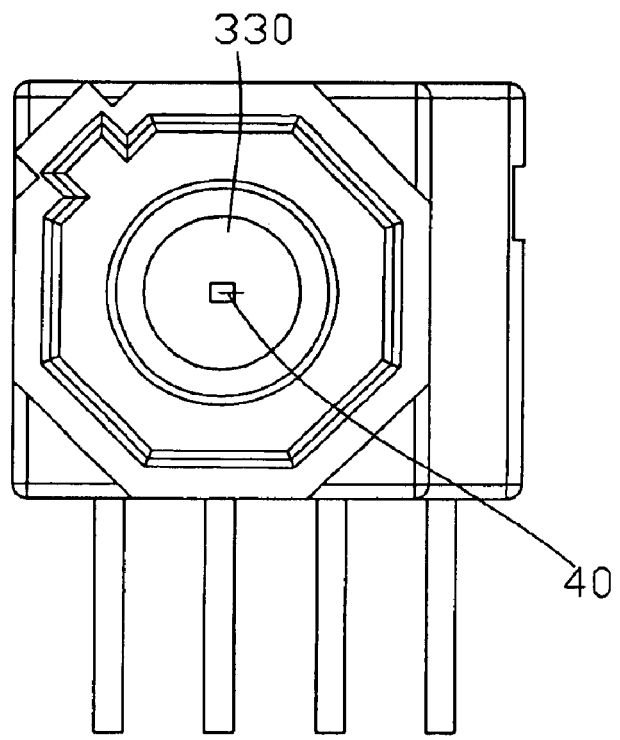
FIG. 17A is a schematic mounting diagrams of the light-emitting diodes (LED) according to an embodiment of the present invention.
Figure 17B:
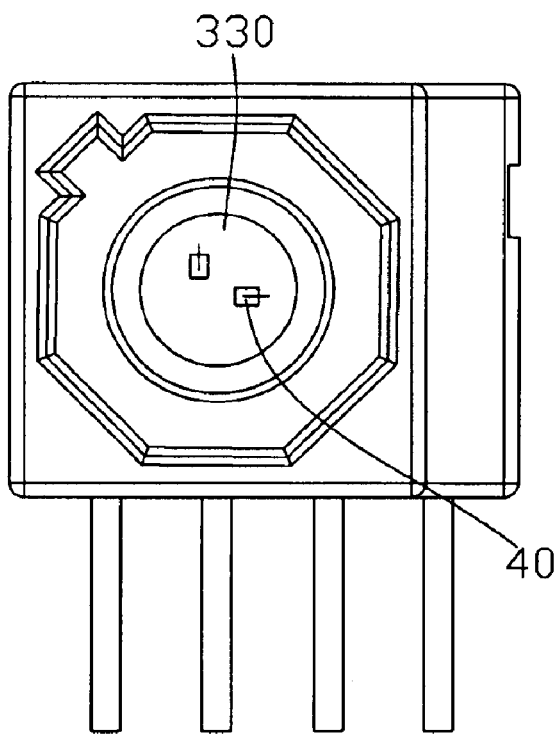
FIG. 17B is a schematic mounting diagram of the light-emitting diodes (LED) according to another embodiment of the present invention.
Figure 17C:
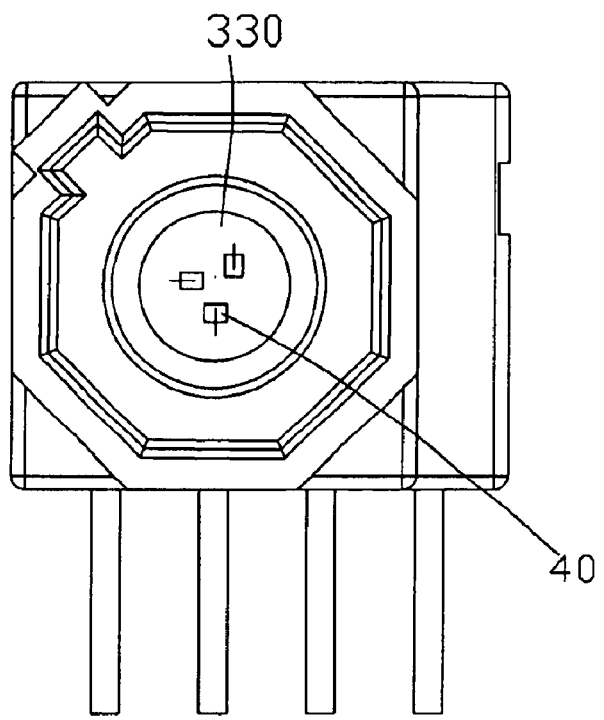
FIG. 17C is a schematic mounting diagram of the light-emitting diodes (LED) according to another embodiment of the present invention.
Figure 17D:
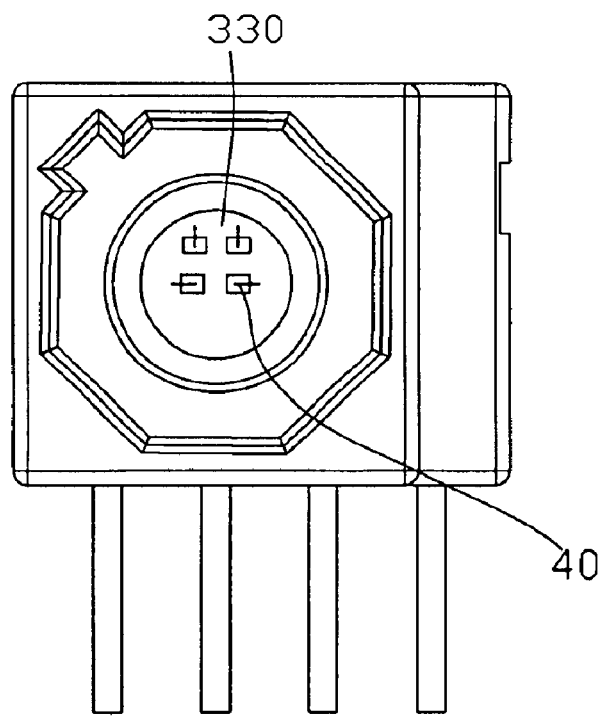
FIG. 17D is a schematic mounting diagram of the light-emitting diodes (LED) according to another embodiment of the present invention.

FIG. 17A through FIG. 17D are schematic mounting diagrams of the light-emitting diodes (LED) of varied embodiments of the invention. As shown in FIG. 17a, an LED 40 is mounted at the center of the circular mounting plane 350. As shown in FIG. 17B, the center lines of two LEDs 40 and the center of the circular mounting plane 350 are in one line, and preferably, the center distance of the two LCDs is as small as possible. As shown in FIG. 17C, the centers of the three LEDs 40 fall within a circle which is preferably as small as possible. The center of the circle coincides with the center of the circular mounting plane 350. Besides, the three lines connecting the centerlines of the LEDs and the center of the circular mounting plane 350 are formed in 120-degree angles adjacent to one another. As shown in FIG. 17d, the centers of the four LEDs 40 fall within a circle which is preferably as small as possible and the center of the circle coincides with the center of the circular mounting plane 350. In addition, the four adjacent connecting lines connect between the centerlines of the LEDs to form a square. As a result, according to the aforementioned illustration, since the LEDs are mounted on the circular mounting plane 350 with distances that are as close as possible to the light axis and the disposition is uniformly distributed, the luminous intensity of the light beam assembly can concentrate further to the light axis.

Figure 18:
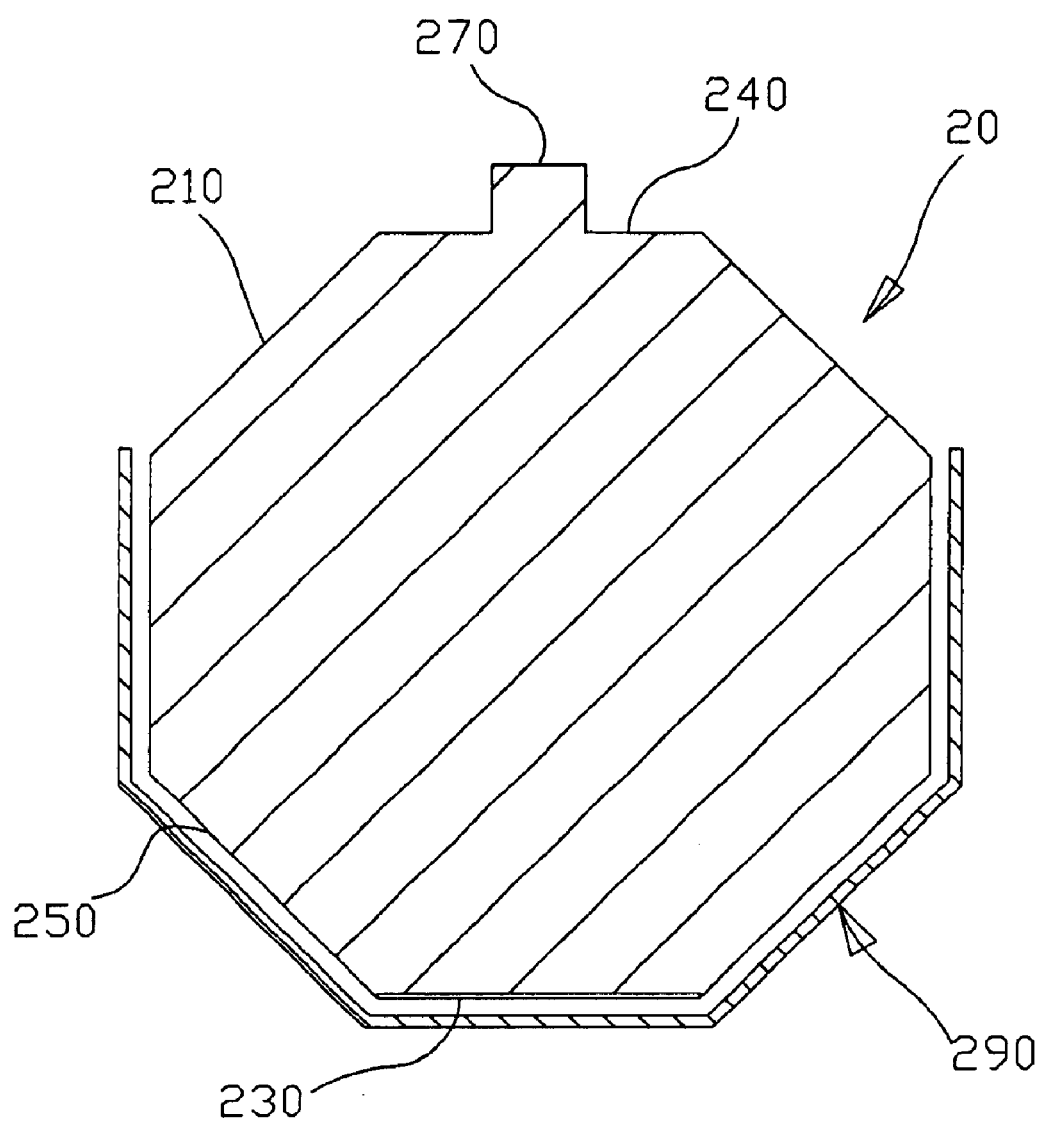
FIG. 18 is a schematic cross-sectional view of the light-guide bar according to an embodiment of the present invention.

At last, please refer to FIG. 18, the outer part of the octagonal column 210 of light-guide bar 20 can be covered with a polygonal light-reflective sheath 290, wherein the sheath 290 encloses some of the reflective layers 250 and the reflective plane 230. The whose function of the sheath is for condensing the light so that the energy of incident light 200 can be used efficiently in the light-guide bar 20, and emitted through the light-exiting plane 270.

While the invention has been described by way of examples and in terms of a preferred embodiment, it is to be understood that the invention is not limited to the disclose embodiment. On the contrary, it is intended to cover various modifications.

What is claimed is:

1. A linear light source device comprising:
a light source assembly comprising a positioning plane, a reflective surface, a mounting plane, and a light-emitting diode mounted in the reflective surface; and
a light-guide bar comprising a polygonal column, a light-exiting plane, a reflective plane, and a plurality of reflective layers and further comprising at least a tail end of said light-guide bar being an incident plane for light to enter, wherein the reflective plane comprises surface stripes and is positioned opposite the light-exiting plane, and the reflective layers have a reflecting function so that the light transmitting into the incident plane and through the polygonal column and reflected off of the reflective plane and layers is transmitted out of the light-exiting plane; and
a light-reflective sheath covering a portion of the reflective layers and the reflective plane.

2. The linear light source device of claim 1, wherein the polygonal column of the light-guide bar is an octagonal column.

3. The linear light source device of claim 1, wherein a centerline of the polygonal positioning plane of the light source assembly is perpendicular to the mounting plane.

4. The linear light source device of claim 1, wherein the positioning plane of the light source assembly is tightly fit to the incident end of the light-guide bar.

5. The linear light source device of claim 1, wherein a centerline of the reflective surface of the light source assembly coincides with a light axis of the light beam.

6. The linear light source device of claim 1, wherein a rectangular opening for mounting a light-emitting diode is formed in portion of the reflective plane of the light source assembly.

7. The linear light source device of claim 1, wherein the at least one light-emitting diode of the light source assembly is mounted and uniformly distributed on the reflective surface.

8. The linear light source device of claim 1, wherein the light-exiting plane on the light-guided bar is on a surface which protrudes from the light-guide bar.

9. The linear light source device of claim 8, wherein the light-exiting plane is in a long strip profile whose length can be adjusted in accordance with application so as to achieve ideal luminous intensity.

10. The linear light source device of claim 1, wherein the reflective plane has stripes on its surface, and the stripes are treated by segmentation so that each segment has different surface roughness.

11. The linear light source device of claim 10, wherein the stripes are grooved stripes which are divided into at least two segments, the roughness of the stripes in every segment is the same but the stripes of the segments are different in depth and width.

12. The linear light source device of claim 1, wherein the reflective plane of the polygonal column has stripes on its surface, and the stripes are treated by segmentation such that surface roughness is relatively smooth near the light source while the surface roughness increases gradually as the stripes are a located farther from the light source so as to improve the uniformity of the light beam transmitting out of the light-exiting plane.

13. The linear light source device of claim 1, wherein the surface, of the reflective plane of the polygonal column is film-coated with silver-white light-reflective paint.

14. The linear light source device of claim 1, wherein another end plane of the polygonal column is a tail end plane for reflecting the light beam that is incident to the plane, back into the main body of the octagonal main body.

15. The linear light source device of claim 1, wherein a surface of the tail end plane of the light-guided bar is film-coated with silver-white light-reflective paint.

* * * * *